March 30, 1937.  E. O. E. TYDÉN  2,075,316
SILENCER FOR INTERNAL COMBUSTION ENGINES
Filed Nov. 16, 1934  6 Sheets-Sheet 5

Inventor:
Einar Olof Eugen Tydén
by George Bayard Jones
Attorney.

Patented Mar. 30, 1937

2,075,316

UNITED STATES PATENT OFFICE 2,075,316

SILENCER FOR INTERNAL COMBUSTION ENGINES

Einar Olof Eugen Tydén, Stockholm, Sweden, assignor, by mesne assignments, to Carl Theodor Setterberg, Stockholm, Sweden Application November 16, 1934, Serial No. 753,366
In Sweden November 21, 1933

8 Claims. (Cl. 181—46)

The present invention relates to a silencer for internal combustion engines which comprises, in a manner known per se, a body, or several bodies, provided in the gas exhaust pipe of the engine and which is, or are, provided with a plurality of flow passages for the exhaust gases extending in or at least approximately in the longitudinal direction of the gas exhaust pipe. The purpose of the invention is to provide a silencer of this type which shall be as efficient as possible, that is to say, which shall effect as complete a deadening or muffling as possible of the noise caused by the exhaust gases escaping from the engine into the open air. With this purpose in view the invention consists principally in the said flow passages being made in such manner that the sum of their smallest cross-sectional areas is substantially smaller than the cross-sectional area of the gas exhaust pipe of the engine, so that a choking of the gases is effected while they flow through the passages, and that the length of each passage, in the direction of flow of the gases, is several times the diameter, or largest cross-sectional dimension, of the passage, so that the velocity of the exhaust gases distributed among the various passages is equalized while the gases flow through the long and narrow passages.

It has been established by extensive experiments that this arrangement of the passages results in a practically complete elimination of the noise, which is presumably due to the gas current being divided into a great number of fine streams or jets, and to the velocity of said jets being equalized to a considerable extent, partly due to the choking, and partly due to the flow through the relatively long and narrow passages, so that the gases flow out from the passages at an approximately uniform velocity. Even large and powerful internal combustion engines as, for instance, those used in flying machines, may, therefore, with the use of such a simple and inexpensive silencer be made to operate practically completely silent. Tests have also demonstrated that, contrary to what might be expected, the above mentioned choking of the gases does not result in any appreciable reduction of the effect of the engine.

In certain cases it may be suitable to construct the silencer in such manner that the free cross-sectional area of the flow passages may be varied within certain limits, so that one and the same silencer may be used with advantage for engines of several different sizes. For this purpose adjustable or movable regulating bodies may be provided in the flow passages, said bodies and the passages being given such shape, for instance a conical shape, that the free cross-sectional areas of the passages may be varied by adjustment of the bodies relatively to the passages.

According to the invention, two or more bodies having flow passages for the exhaust gases, may be inserted in the gas exhaust pipe of the engine, one body behind the other in the direction of flow of the gases, in such manner that there is a space between two adjacent bodies through which space the gases leaving the passages of a preceding body, taken in the direction of flow, may flow before they flow into the passages in the next body, the flow passages in at least one of said bodies being such that the sum of their smallest cross-sectional areas is substantially smaller than the cross-sectional area of the gas exhaust pipe of the engine. By the exhaust gases being in this way given an opportunity to flow through a space, or several spaces, between the bodies, it appears to be possible to attain a still more complete equalization of the velocity of the exhaust gases while they flow through the long and narrow passages in the bodies.

The passages in the body located in the gas exhaust pipe of the engine may be made in such manner that their cross-sectional area gradually decreases in the direction of flow of the gases, the sum of their smallest cross-sectional areas, at least, being substantially smaller than the cross-sectional area of the gas exhaust pipe of the engine. In practice this may suitably be carried out in such manner that the flow passages in the body are given a conical shape.

With this shape of the passages it has proved possible to obtain a still more complete equalization of the velocity of the exhaust gases while they flow through the long and narrow passages in the body, that is to say, a reduction of the amplitude of the gas puffs produced by the explosions in the engine, and thus a substantially complete elimination of the noise. It has been found by experiment that it is particularly suitable to locate the body provided with the flow passages in a widened portion of the gas exhaust pipe of the engine, and to shape the passages in such manner that the sum of their largest cross-sectional areas, at the entrance openings, is larger than the cross-sectional area of the gas exhaust pipe of the engine, whereas the sum of their smallest cross-sectional areas, at the exit openings, is substantially smaller than the cross-sectional area of the gas exhaust pipe of the engine. This arrangement facilitates the distribution of the gases into a great number of thin jets, which has proved to entail the great advantage that the distribution and choking of the gases do not result in any appreciable reduction of the effect of the engine.

A still better result has been attained by inserting a widened portion of the gas exhaust pipe of the engine two or more bodies having flow passages, one body behind the other in the direction of flow of the gases, in such manner that an intermediate space is formed between two adjacent bodies, and by making the passages in these bodies in such manner that the sum of the largest cross-sectional areas, at the entrance openings, of the passages in the foremost body, taken in the direction of flow of the gases, is larger than the cross-sectional area of gas exhaust pipe of the engine, whereas the sum of the smallest cross-sectional areas, at the exit openings, of the passages in one at least of the bodies is substantially smaller than the cross-sectional area of the gas exhaust pipe of the engine.

The body having flow passages may be made in one piece, and the passages in the same may have a circular cross-sectional shape, or the body may be made of several parts, and the passages may have another cross-sectional shape than a circular one.

In the accompanying drawings a few constructional forms of the invention are shown by way of example.

Figure 1:
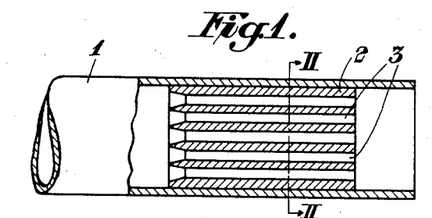
Fig. 1 shows a silencer according to the invention in longitudinal section.
Figure 2:
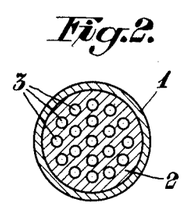
Fig. 2 shows the same in cross section on the line II—II in Fig. 1.

In the constructional form illustrated in Figs. 1 and 2, 1 denotes the gas exhaust pipe of the engine. Secured in said pipe some distance from its end is a cylindrical body 2 which is provided with a great number of comparatively narrow flow passages 3 which, in this case, have an axial direction. The body 2 may consist of metal or any other suitable material which is heat-resistant. According to the invention, the passages 3 are constructed in such manner that the total cross-sectional area of the same is considerably smaller than the cross-sectional area of the exhaust pipe 1, so that the gases are choked while flowing through the passages, and, in the instance illustrated, the length of each passage 3 is about 20 times its diameter. The gases flowing puffwise through the exhaust pipe 1 are distributed among the various passages 3, and partly owing to the said choking of the gases, partly owing to the great length of the passages relatively to their diameter, the velocity of flow of the gases is equalized while they flow through the passages, so that, finally, the gases flow out from the passages 3 at a practically uniform velocity. In this way a very efficient elimination of the noise is obtained. Tests performed with silencers of this construction have also established that the said choking of the gases does not result in any noticeable reduction of the effect of the engine.

Figures 3, 4:
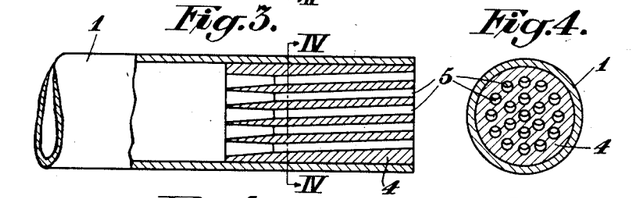
Figs. 3 and 4 show in a similar manner a somewhat modified constructional form of the silencer, Fig. 4 showing a cross section on the line IV—IV in Fig. 3.

The constructional form illustrated in Figs. 3 and 4 differs from that above described and illustrated in Figs. 1 and 2 by the body 4 being inserted in the gas exhaust pipe immediately adjacent the end of the latter, and by the passages 5 in the body 4 not having a perfectly axial direction but extending slightly obliquely to the axis of the cylindrical body. Also in this case the passages are made in such manner that the total cross-sectional area of the same is considerably smaller than the cross-sectional area of the pipe 1, so that the gases are choked when flowing through the passages, and the length of each passage is also in this case about 20 times its diameter. The abovementioned oblique location of the passages 5 relatively to the axis of the body 4 appears to produce a certain additional checking of the gases flowing through the passages, so that additional security is obtained for the gases flowing out from the passages at as uniform a rate of speed as possible.

Figure 5:
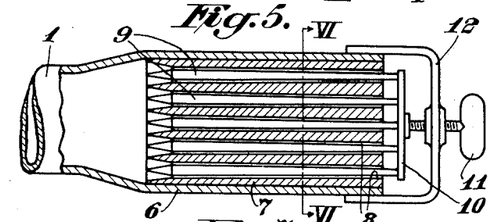
Fig. 5 shows a longitudinal section of a further constructional form which is arranged in such manner that the size of the flow passages may be varied.
Figure 6:
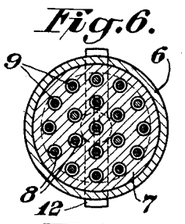
Fig. 6 shows a cross section on the line VI—VI in Fig. 5.

According to the constructional form illustrated in Figs. 5 and 6 the silencer is arranged in such manner that the cross-sectional area of the flow passages may be varied within certain limits so that one and the same silencer may advantageously be used for engines of several different sizes. As shown in Fig. 5, the gas exhaust pipe 1 is provided at its end with a somewhat widened portion 6 in which a cylindrical body 7 is inserted, which is provided with a plurality of axial flow passages 8, which in this case are made slightly conical in such manner that they taper towards the rear ends of the passages, taken in the direction of flow of the gases, i. e. the right-hand ends, as viewed in Fig. 5.

Positioned in each passage is a long and narrow adjusting pin 9 of the same taper as the passage, so that a flow passage for the gas having an annular cross section is formed between said pin and the wall of the passage. All of said pins 9 have their narrower ends, which project from the rear ends of the passages 8, secured to a plate 10 which may be adjusted towards and away from the rear end of the body 7 by the aid of a wing screw 11 which is screw-threaded in a yoke 12 secured to the pipe portion 6. When the pins 9 are moved in the direction to the left in Fig. 5 relatively to the fixed body 7, the areas of the abovementioned annular flow passages are obviously increased somewhat, whereas they are reduced when the pins 9 are moved in the opposite direction. The flow passages are so dimensioned, however, that in any case their total cross-sectional area is substantially less than the cross-sectional area of the exhaust pipe 1, so that the desired choking of the gases is always effected, and so that the length of each passage is many times the largest cross-sectional dimension of the passage, in any arbitrary cross-sectional plane, reduced by that portion of said cross-sectional dimension which represents the cross-sectional dimension of the adjusting pin in the same cross-sectional plane.

Figure 7:
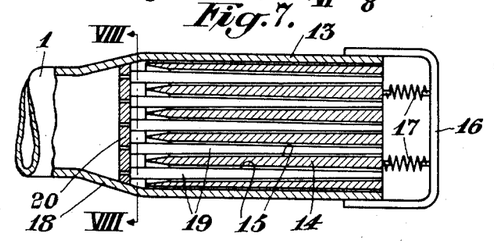
Fig. 7 shows a longitudinal section of a constructional form in which the body provided in the gas exhaust pipe is automatically adjustable under spring action.
Figure 8:
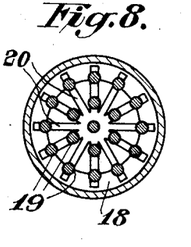
Fig. 8 is a cross section on the line VIII—VIII in Fig. 7.

In the constructional form illustrated in Figs. 7 and 8 the gas exhaust pipe 1 is provided, as in Fig. 5, with a somewhat widened portion 13 at its end. Movably mounted in said portion is a cylindrical body 14 which is provided with axial and slightly conical flow passages 15 which taper towards the rear end, or right-hand end as viewed in Fig. 7, of the body 14.

The body 14 is actuated by two compression springs 17 inserted between said body and a yoke 16 secured to the portion 13, which springs tend to maintain the body 14 in the position illustrated in Fig. 7 in which said body bears with its forward or left-hand edge against the conical portion 18 intermediate the portion 13 and the pipe 1. Projecting into each passage 15 is an adjusting pin 19 having the same degree of taper as the passage, so that also in this case a flow passage for the gas having an annular cross section is formed between the pin and the wall of the passage. The forward wider ends of the pins 19 are secured to a star-shaped spider 20 which is secured in the conical portion 18 and between the arms of which the gases may flow freely. When the body 14 occupies the position shown in Fig. 7, the total cross-sectional area of the said annular flow passages is small. If the pressure in the gas exhaust pipe 1 rises above a certain value, however, the body 14 is displaced under the influence of such increased pressure to the right in Fig. 7 while compressing the springs 17, and as a result of such displacement the total cross-sectional area of the annular passages will obviously be somewhat increased. The movable body 14 will thus automatically adjust itself in a position which corresponds to the increased pressure in the gas exhaust pipe 1, so that the flow passages obtain a suitable size corresponding to the increased pressure.

Figure 9:
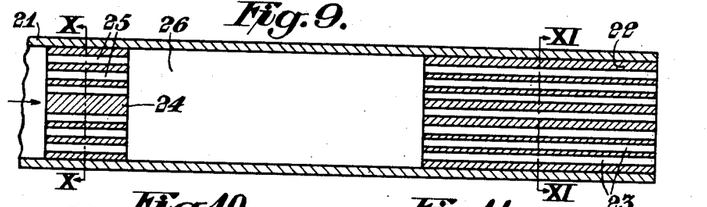
Fig. 9 shows a longitudinal section of a silencer having two bodies located one behind the other.
Figure 10:
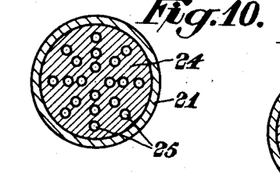
Figs. 10 and 11 show cross sections of the silencer on the lines X—X and XI—XI, respectively, in Fig. 9.

In the constructional form illustrated in Figs. 9–11, 21 denotes the gas exhaust pipe of the engine. Secured in said pipe some distance inside its end opening is a cylindrical body 24 which is provided with a large number of axial narrow flow passages 25. Inserted in the gas exhaust pipe 21 some distance behind the body 24 in the direction of flow of the gases indicated by the arrow in Fig. 9, is a similar cylindrical body 22 which in this case is longer, and which likewise is provided with a plurality of axial narrow flow passages 23, in such manner that a relatively large space 26 is formed between the two bodies 24 and 22.

The passages 25 in the body 24 as well as the passages 23 in the body 22 are in this case made in such manner that their total cross-sectional area is substantially smaller than the cross-sectional area of the exhaust pipe 21, so that choking of the exhaust gases is effected when they flow through the passages in the two bodies. In the instance illustrated, the length of the passages 25 is approximately 10 times their diameter, and the length of the passages 23 is approximately 30 times their diameter. The sum of the cross-sectional areas of the passages is smaller in the body 24 which is located closer to the engine, than in the body 22 which is located farther from the engine.

The gases flowing puffwise through the exhaust pipe 21 are first distributed among the various passages 25 in the body 24, and owing to the gases being choked and to the great length of the passages relative to their diameter, a substantial equalization of the velocity of flow of the gases is effected in said passages, that is to say, a reduction of the amplitude of the gas puffs produced by the explosions in the engine. When the gases have passed through the passages 25, they flow through the large space 26 intermediate the two bodies. The gases are then again distributed among the various passages 23 in the body 22, in which passages a further equalization of the velocity of flow of the gases, or a further reduction of the amplitude of the gas puffs, is effected, so that finally the gases flow out from the passages 23 at an approximately fully uniform velocity.

Figures 11, 14:
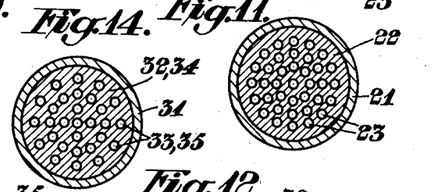
Fig. 14 is a cross section on either of the lines XIV—XIV in Fig. 12.
Figure 12:
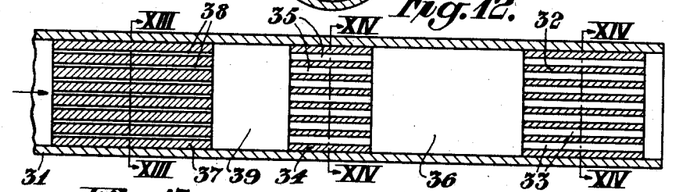
Fig. 12 shows a longitudinal section of a silencer having three bodies located one behind the other.
Figure 13:
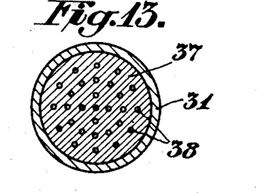
Fig. 13 is a cross section on the line XII—XII in Fig. 12.

In the constructional form illustrated in Figs. 12–14, three bodies having flow passages, are inserted in the gas exhaust pipe 31, one body behind the other in the direction of flow of the gases indicated by the arrow in Fig. 12. Inserted in the exhaust pipe some distance from its end opening is a cylindrical body 37 which is provided with a large number of axial narrow flow passages 38. Some distance behind the body 37 a second cylindrical body 34, which is likewise provided with a large number of axial narrow flow passages 35, is inserted in the exhaust pipe in such manner that a comparatively large space 39 is formed between the two bodies 37 and 34.

Inserted some distance beyond the body 34 in the direction of flow of the gases and just inside the end opening of the gas exhaust pipe is a third cylindrical body 32 which is provided with a large number of axial narrow flow passages 33, in such manner that a space 36 is formed between the two bodies 34 and 32.

The passages 38, 35 and 33 in each of the three bodies are made in such manner that their total cross-sectional area is substantially smaller than the cross-sectional area of the exhaust pipe 31, so that the exhaust gases are choked while they flow through the passages in the three bodies. The length of the passages 38 is about 40 times their diameter, and the length of the passages 35 is about 10 times their diameter, while the length of the passages 33 is about 15 times their diameter. The space 39 between the two first bodies 37 and 38, taken in the direction of flow of the gases, has a length which is about one-half the length of the space 36 between the two bodies 34 and 32. In this constructional form the three bodies are thus located in such manner that the intermediate spaces between said bodies are of increasing size in the direction towards the last body 32, in the direction of flow of the gases. The sum of the cross-sectional areas of the passages is smaller in the body 37, which is located nearest to the engine, than in the two bodies 34 and 32, which are farther from the engine.

Figure 15:
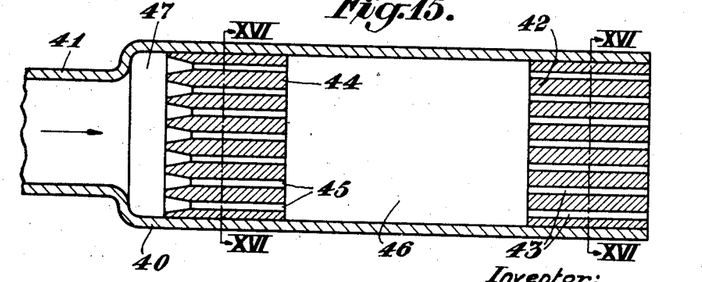
Fig. 15 shows a longitudinal section of a silencer having two bodies located one behind the other, which are inserted in a widened portion of the gas exhaust pipe.
Figure 16:
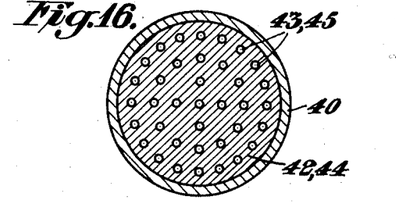
Fig. 16 is a cross section on either of the lines XVI—XVI in Fig. 15.

In the constructional form illustrated in Figs. 15 and 16, two bodies having flow passages are located in the widened outer portion 40 of the gas exhaust pipe 41, one body behind the other in the direction of flow of the gases indicated by the arrow in Fig. 15. Located innermost in the widened portion 40 is a cylindrical body 44 which is provided with a great number of axial narrow flow passages 45. Inserted some distance from the body 44 at the end opening of the widened portion 40 is a second cylindrical body 42 which is likewise provided with a great number of axial narrow flow passages 43, in such manner that a space 46 is formed between the two bodies 42 and 44. The passages 45 and 43 in each of the two bodies are in this case made in such manner that their total cross-sectional areas is substantially smaller than the cross-sectional area of the exhaust pipe 41, so that the exhaust gases are choked when they flow through the passages in the two bodies. In the instance illustrated, the length of the passages 45 is about 15 times their diameter. It is also to be observed that the openings of the passages 45 directed towards the space 47 in front of the body 44 are conically widened for facilitating the distribution of the gases among the passages 45. The length of the passages 43 is about 15 times their diameter. The intermediate space 46 between the two bodies has approximately the same length as the length of the two bodies 44 and 42 taken together.

Figure 17:
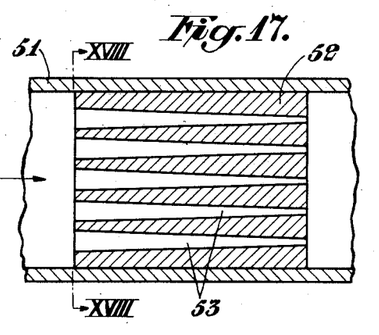
Fig. 17 shows a longitudinal section of a silencer having a body with conical flow passages.
Figure 18:
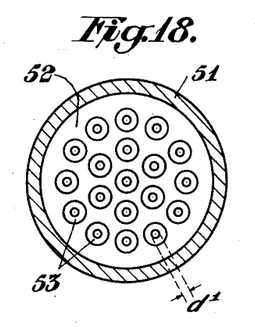
Fig. 18 is a cross section on the line XVIII—XVIII in Fig. 17.

In the constructional form illustrated in Figs. 17 and 18, 51 denotes the gas exhaust pipe of the engine. Inserted in said pipe some distance from its end opening is a cylindrical body 52 which is provided with a large number of axial narrow flow passages 53. The flow passages 53 in the body are made conical in such manner that their cross-sectional area gradually decreases in the direction of flow of the gases indicated by the arrow in Fig. 17, the sum of their smallest cross-sectional areas, at least, being substantially smaller than the cross-sectional area of the gas exhaust pipe 51, so that choking of the exhaust gases is effected while they flow through the passages 53. In the instance illustrated the length of the passages 53 is about 30 times their smallest diameter $d^1$.

The gases flowing puffwise through the exhaust pipe 51 are distributed among the various passages 53 in the body 52, and owing to the conical shape of said passages through which the gases are choked more and more, a substantial equalization of the velocity of flow of the gases, or reduction of the amplitude of the gas puffs, is effected in the passages, so that the gases flow out from the passages 53 at an approximately fully uniform velocity.

Figure 19:
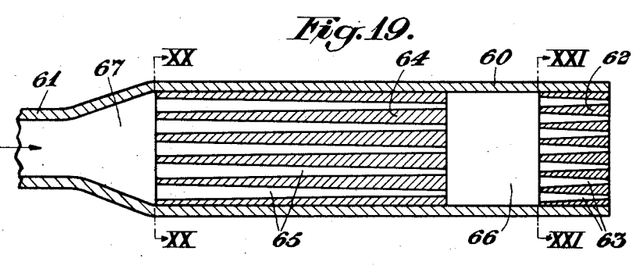
Fig. 19 shows, likewise in longitudinal section, a silencer having two bodies located one behind the other in the direction of flow of the gases in a widened portion of the gas exhaust pipe of the engine.
Figure 20:
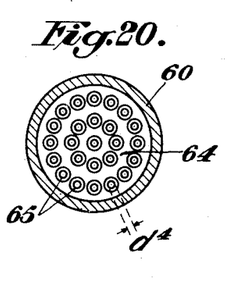
Fig. 20 shows a cross section on the line XX—XX in Fig. 19.
Figure 21:
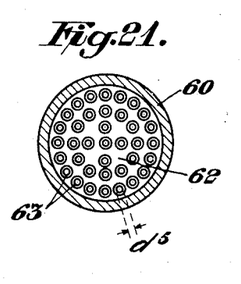
Fig. 21 shows a cross section on the line XXI—XXI in Fig. 19.

In the constructional form illustrated in Figs. 19, 20 and 21, two bodies having flow passages are located in a considerably widened portion 60 of the gas exhaust pipe 61, one body behind the other in the direction of flow of the gases indicated by the arrow in Fig. 19.

Inserted innermost in the widened portion 60 adjacent the conical space 67 is a cylindrical body 64 which is provided with a large number of axial narrow flow passages 65. Also inserted in the widened portion 60 some distance beyond the body 64 is a second cylindrical body 62 which also is provided with a large number of axial narrow flow passages 63, in such manner that a comparatively large intermediate space 66 is formed between the two bodies 64 and 62. The passages 65 and 63 in the two bodies are made conical in such manner that their cross-sectional area gradually decreases in the direction of flow of the gases, and so that the sum of their largest cross-sectional areas, at the entrance openings, is larger than the cross-sectional area of the gas exhaust pipe 61, whereas the sum of the smallest cross-sectional areas, at the exit openings, of the passages 63 in the last body 62 is substantially smaller than the cross-sectional area of the gas exhaust pipe 61, so that a systematical choking of the exhaust gases is effected while they flow through the passages in both bodies. In the instance illustrated the length of the passages 65 is about 75 times their smallest diameter $d^4$, and the length of the passages 63 is about 36 times their smallest diameter $d^5$.

Figure 22:
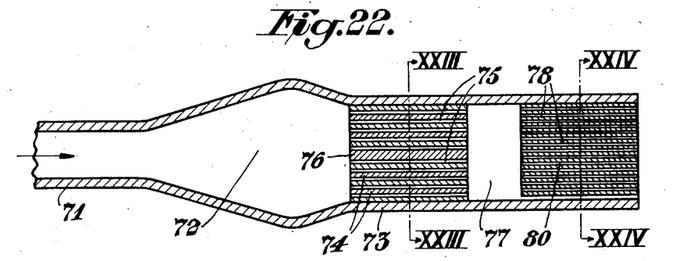
Fig. 22 shows a longitudinal section of a silencer having two bodies located one behind the other in the direction of flow of the gases, said bodies being made in different ways, in the instance illustrated.

In Fig. 22, 71 denotes the gas exhaust pipe of the engine which is provided, at some distance from the end opening, with a widened portion 72 of double conical shape, and beyond said widened portion is a cylindrical portion 73 which is somewhat wider than the gas exhaust pipe 71.

Figure 23:
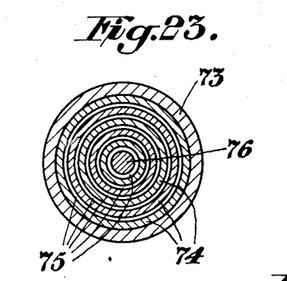
Fig. 23 is a cross section on the line XXIII—XXIII in Fig. 22.

Inserted in the portion 73 immediately after the widened portion 72 is the first body, which is made according to Fig. 23 and consists, in the instance illustrated, of five tube sections 74 of equal length but unequal width, which are inserted within each other, and of a cylindrical rod 76 inserted in the innermost tube section. Longitudinal ribs or ridges, not shown in the drawings, are provided in or on the tube sections, and on the rod, which ribs or ridges maintain the tube sections and the rod at the correct mutual distances from one another and divide the annular passages formed between said tube sections and rod into many times the number of passages 75 having an arcuate cross section. The tubes 74 and the rod 76 shall be so dimensioned that the sum of the cross-sectional areas of all passages 75 is substantially smaller than the cross-sectional area of the exhaust pipe 71, so that choking of the exhaust gases is effected while they flow through the passages, and that the length of each passage is several times its largest cross-sectional dimension measured along the arcuate middle line of the cross section.

Figure 24:
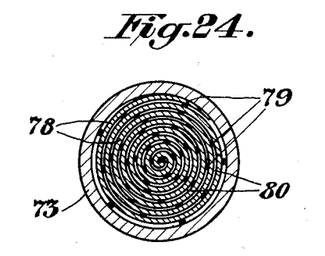
Fig. 24 is a cross section on the line XXIV—XXIV in Fig. 22.

Inserted in the pipe portion 73 some distance beyond this first body, taken in the direction of flow of the gases indicated by the arrow in Fig. 22 is a second body which is made according to the cross-section shown in Fig. 24, in such manner that there is an intermediate space 77 between the two bodies.

Said second body consists of a plate 78 bent to spiral shape, between the turns of which a plurality of wires or rods 79 are inserted through which the turns of the spiral are held at a fixed distance from each other and the spiral-shaped space between the turns is divided into a plurality of narrow passages 80 having an arcuate cross section. Also in this case the members 78 and 79 shall be so dimensioned that the sum of the cross-sectional areas of all passages 80 is substantially smaller than the cross-sectional area of the exhaust pipe 71, and that the length of each passage 80 is several times its largest cross-sectional dimension measured along the arcuate middle line of the cross section.

Figure 25:
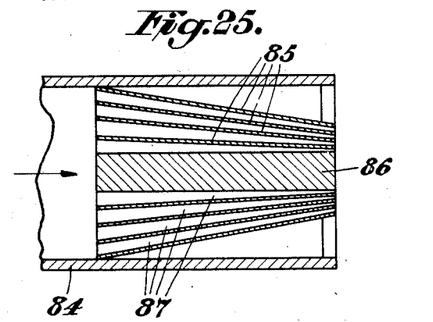
Fig. 25 shows a longitudinal section of a constructional form consisting of conical tube sections.

According to Fig. 25 the body inserted in the pipe 84, which may either be the gas exhaust pipe itself or a widened portion thereof, consists of a plurality of tube sections 85 of different widths and of a cylindrical rod 86 inserted in the innermost tube. Also in this case, as in Fig. 23, longitudinal ribs or ridges, not shown in the drawings, are provided on the tubes, to maintain the same at definite mutual distances and to divide the annular passages between the tubes into many times the number of passages 87 having an arcuate cross section. The tube sections 85 have in this case conical shape so that the cross-sectional area of the passage formed between the tubes gradually decreases in the direction of flow of the gases indicated by the arrow in Fig. 25, and the sum of their smallest cross-sectional areas at least, at the exit openings to the right in Fig. 25, shall be substantially smaller than the cross-sectional area of the gas exhaust pipe.

Figures 26, 27:
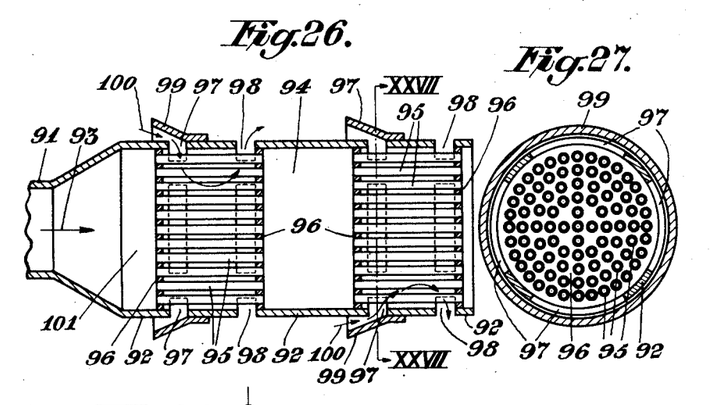
Fig. 26 shows a longitudinal section of a silencer having two bodies located one behind the other and built up of tubes united to each other.
Fig. 27 shows a cross section of the silencer on the line XXVII—XXVII in Fig. 26.

In the constructional form illustrated in Figs. 26 and 27, which is intended to be used, in the first place, in motor cars, motor cycles, flying machines, and similar vehicles, 91 denotes the gas exhaust pipe of the engine, which pipe is provided with a widened portion 92 at its outer end. Two bodies having flow passages for the exhaust gases are inserted in said widened portion of the gas exhaust pipe, one body behind the other in the direction of flow of the gases indicated by the arrow 93 in Fig. 26. The two bodies are located at a distance from one another so that there is a comparatively large intermediate space 94 between the bodies. Each body is composed of a large number of narrow tubes 95 the ends of which are closely fitted into apertures provided for the same in two plates 96 which in their turn are closely fitted into the widened portion 92 of the gas exhaust pipe, so that the intermediate spaces between the tubes 95 are shut off from the interior of the gas exhaust pipe, while the tubes themselves form the desired narrow flow passages for the exhaust gases. The tubes 95 in each of the two bodies are so dimensioned that their total free cross-sectional area is substantially smaller than the cross-sectional area of the gas exhaust pipe 91, so that choking of the exhaust gases is effected while they flow through the tubes in both bodies. The length of the tubes 95 is, in the instance illustrated, about 20 times their diameter.

Provided in the wall of that portion 92 of the gas exhaust pipe in which each body is inserted, are two groups of openings, namely one group consisting, in the instance illustrated, of four openings 97 immediately behind the first plate 96, taken in the direction of flow of the exhaust gases, and one group also comprising four openings 98 immediately in front of the rearmost plate 96. Through these openings the outside air may be led into and out of the spaces between the tubes 95 for the purpose of cooling the later. For the purpose of furthering the inflow of the air through the openings 97 there is secured immediately to the rear of the same on the outside of the pipe portion 92 an annular conical shield 99 which, when the silencer is mounted, for instance, on a motor car which is assumed to move in the direction toward the left in Fig. 26, gathers the air and conducts it through the openings 97, as indicated by the arrows 100 in Fig. 26. The cool air sweeps around the tubes 95 and then flows out into the atmosphere through the openings 98.

The gases flowing puffwise through the exhaust pipe 91 first pass through the space 101 and are then distributed among the various tubes 95 in the first body 95, 96.

Owing to the choking of the gases and to the great length of the tubes relative to their diameter, a substantial equalization of the velocity of flow of the gases, that is to say, a reduction of the amplitude of the gas puffs, is effected in said tubes, and this equalization or reduction appears to be furthered by the tubes 95 being maintained in a cool state by the cool air sweeping over their outsides. When the exhaust gases have flown through the tubes 95 of the first body, they pass through the intermediate space 94 between the two bodies. The gases are then again distributed among the various tubes 95 of the second body in which tubes, which are likewise cooled by the outside cool air flowing through the spaces between the same, a further equalization of the velocity of flow of the gases is effected, so that finally the exhaust gases flow out from the tubes 95 in the second and last body at an approximately fully uniform velocity.

Figure 28:
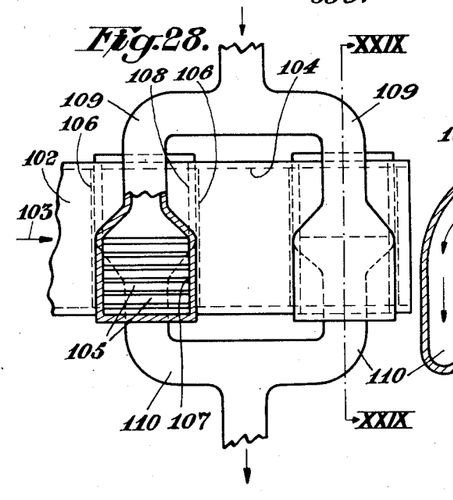
Fig. 28 shows another constructional form of the silencer, viewed from the side and partly in section.
Figure 29:
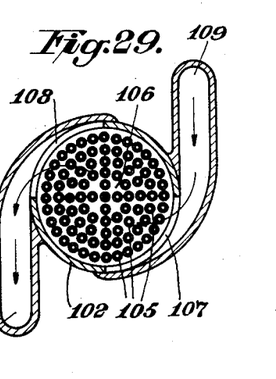
Fig. 29 is a cross section through the same on the line XXIX—XXIX in Fig. 28.

The constructional form illustrated in Figs. 28 and 29 is intended to be used in such cases when a sufficient quantity of cooling water is available, for instance, in motor boats and the like. Also in this case there are inserted in the gas exhaust pipe 102 of the engine two bodies having flow passages for the exhaust gases, one body behind the other in the direction of flow of the gases indicated by the arrow 103 in Fig. 28, in such manner that there is an intermediate space 104 between the two bodies.

Also in this case each body is composed of a large number of narrow tubes 105 the ends of which are closely fitted in holes in two plates 106 which in their turn are fitted in the gas exhaust pipe 102. The wall of each such portion of the gas exhaust pipe 102 in which a body is inserted, is provided with two openings 107 and 108 diametrically placed on opposite sides of the gas exhaust pipe, the opening 107 being in communication with a supply conduit 109 for cooling water, for instance, from the water pump of the engine, and the opening 108 being in communication with a conduit 110 for the discharge of the cooling water. In this manner it is thus possible to conduct cooling water through the intermediate spaces between the tubes 105 for cooling the latter and thus also the exhaust gases flowing through the tubes, without the cooling water coming in direct contact with said gases.

The gas exhaust pipe of the engine may be provided, in front of the body or bodies having flow passages inserted therein, with a widened portion having a considerable volume through which widened portion the gases are allowed to flow before the gases are distributed among the various flow passages in the body.

A constructional form of this character is illustrated in Figs. 30 to 33 inclusive in which 111 denotes the gas exhaust pipe of the engine, which pipe is provided at a distance from its mouth with a widened portion 112 having a considerable volume and a substantially cylindrical shape, and beyond said widened portion with a cylindrical portion 113 of the same diameter as the gas exhaust pipe 111. Inserted in said portion 113 is an extension pipe 114 in which there are inserted three bodies 115, 116 and 117 having flow passages for the exhaust gases, one body behind the other, in such manner that a space 118 is formed between the bodies 115 and 116, and another space 119 between the bodies 116 and 117. The body 115 which is located closest to the widened portion 112, is provided with a comparatively small number of axial narrow flow passages 120, the next body 116 is provided with a somewhat larger number of axial narrow flow passages 121, and the third body 117 is provided with a still larger number of axial narrow flow passages 122.

Figure 30:
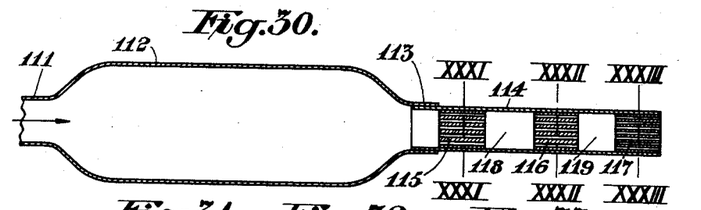
Fig. 30 shows a longitudinal section of a silencer having three bodies located one behind the other in the direction of flow of the gases, said bodies having, in the instance illustrated, different numbers of flow passages.
Figure 31:
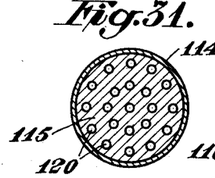
Figs. 31, 32, and 33 show cross sections on the lines XXXI—XXXI, XXXII—XXXII and XXXIII—XXXIII, respectively, in Fig. 30.
Figure 32:
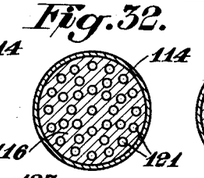
Figure 33:
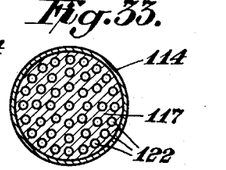

The passages 120, 121 and 122 in each of the three bodies are made in such manner that their total cross-sectional area is substantially smaller than the cross-sectional area of the exhaust pipe 111, so that the exhaust gases are choked while they flow through the passages in the three bodies and the length of each passage 120, 121 or 122 is several times its diameter.

Owing to the presence of the large widened portion 112 which acts as a storage space for the gases, it is possible to make the bodies 115, 116, and 117 considerably smaller and lighter than if said widened portion was not existing.

Figure 34:
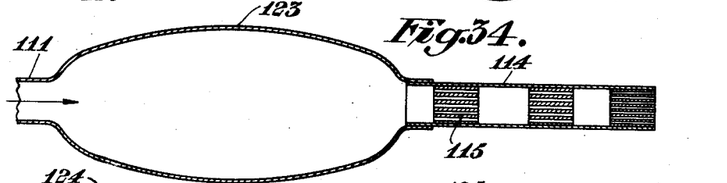
Figs. 34 to 37 show longitudinal sections of a few modified constructional forms of the silencer having different shapes of the widened portion of the gas exhaust pipe.

The constructional form illustrated in Fig. 34 differs from that above described merely by the widened portion 123 in front of the first body 115 in the extension pipe 114 having an approximately ellipsoidal shape.

Figure 35:
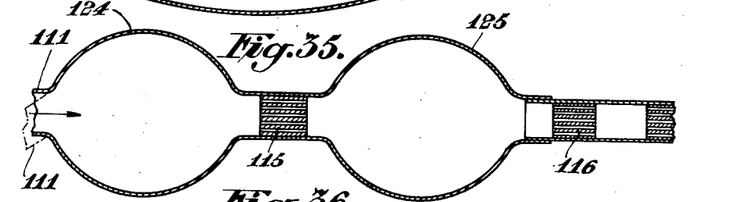

According to Fig. 35 the widened portion 124 in front of the first body 115 has an approximately spherical shape, and between the two bodies 115 and 116 a second widened portion 125 is provided which likewise has an approximately spherical shape. As indicated with dot and dash lines in Fig. 35, the gas exhaust pipe 111 may also enter the widened portion 124 in an oblique direction whereby the gases are given a circling movement in the spherical widened portion.

Figures 36, 37:
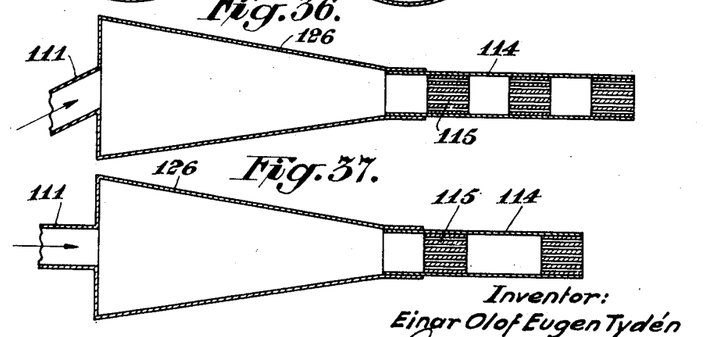

In the constructional forms illustrated in Figs. 36 and 37 the widened portion 126 in front of the first body 115 in the extension pipe 114 has a conical shape and tapers towards the body 115. The gas exhaust pipe 111 may enter the widened portion 126 either in an oblique direction, as shown in Fig. 36, or in the axial direction, as shown in Fig. 37.

The constructional forms above described and illustrated in the drawings are only to be regarded as examples and may of course be further modified in several ways as regards their details without departing from the principle of the invention.

I claim:

1. A silencer for internal combustion engines, comprising a gas exhaust pipe, and at least one body located in said pipe, said body being provided with a plurality of flow passages for the exhaust gases extending at least approximately in the longitudinal direction of said gas exhaust pipe, the sum of the smallest cross-sectional areas of said passages being substantially smaller than the cross-sectional area of said gas exhaust pipe, and the length of each passage in the direction of flow of the gases being several times its largest cross-sectional dimension.

2. A silencer for internal combustion engines, comprising a gas exhaust pipe, and at least two bodies located in said pipe one body behind the other in the direction of flow of the gases in such manner that an intermediate space is formed between two adjacent bodies, said bodies being provided with a plurality of flow passages for the exhaust gases extending at least approximately in the longitudinal direction of said gas exhaust pipe, the sum of the smallest cross-sectional areas of said passages in one at least of said bodies being substantially smaller than the cross-sectional area of said gas exhaust pipe, and the length of each passage in each of said bodies being several times its largest cross-sectional dimension.

3. A silencer for internal combustion engines, comprising a gas exhaust pipe, and at least one body located in said pipe, said body being provided with a plurality of flow passages for the exhaust gases extending at least approximately in the longitudinal direction of said gas exhaust pipe, each of said passages having its cross-sectional area decreasing in the direction of flow of the gases, the sum of the smallest cross-sectional areas of all said passages being substantially smaller than the cross-sectional area of said gas exhaust pipe, and the length of each passage being several times its largest cross-sectional dimension.

4. A silencer for internal combustion engines, comprising a gas exhaust pipe, and at least one body located in said pipe, said body being provided with a plurality of flow passages for the exhaust gases extending at least approximately in the longitudinal direction of said gas exhaust pipe, each of said passages having a conical shape and having its cross-sectional area decreasing in the direction of flow of the gases, the sum of the smallest cross-sectional areas of all said passages being substantially smaller than the cross-sectional area of said gas exhaust pipe, and the length of each passage being several times its largest cross-sectional dimension.

5. A silencer for internal combustion engines, comprising a gas exhaust pipe having a widened portion, and at least one body located in said widened portion of said pipe, said body being provided with a plurality of flow passages for the exhaust gases extending at least approximately in the longitudinal direction of said gas exhaust pipe, each of said passages having its cross-sectional area decreasing in the direction of flow of the gases, the sum of the largest cross-sectional areas at the entrance openings of said passages being larger than the cross-sectional area of said gas exhaust pipe, the sum of the smallest cross-sectional areas at the exit openings of said passages being substantially smaller than the cross-sectional area of said gas exhaust pipe, and the length of each passage being several times its largest cross-sectional dimension.

6. A silencer for internal combustion engines, comprising a gas exhaust pipe having a widened portion, and at least two bodies located in said widened portion of said gas exhaust pipe one body behind the other in the direction of flow of the gases in such manner that an intermediate space is formed between two adjacent bodies, each of said bodies being provided with a plurality of flow passages for the exhaust gases extending at least approximately in the longitudinal direction of said gas exhaust pipe, each of said passages in each of said bodies having its cross-sectional area decreasing in the direction of flow of the gases, the sum of the largest cross-sectional areas at the entrance openings of the passages in the foremost body in the direction of flow of the gases being larger than the cross-sectional area of said gas exhaust pipe, the sum of the smallest cross-sectional areas of the passages at the exit openings of one at least of said bodies being substantially smaller than the cross-sectional area of said gas exhaust pipe, and the length of each passage in each of said bodies being several times its largest cross-sectional dimension.

7. A silencer for internal combustion engines, comprising a gas exhaust pipe, and at least one body located in said pipe, said body being provided with a plurality of flow passages for the exhaust gases extending at least approximately in the longitudinal direction of said gas exhaust pipe, said body consisting of a plate bent to spiral shape, and distance pieces inserted between and dividing the spiral-shaped space between the turns into a plurality of narrow passages having an arcuate cross section, the sum of the smallest free cross-sectional areas of said passages being substantially smaller than the cross-sectional area of said gas exhaust pipe, and the length of each passage in the direction of flow of the gases being several times its largest cross-sectional dimension measured along the arcuate middle line of the cross section.

8. A silencer for internal combustion engines, comprising a gas exhaust pipe, and at least one body located in said pipe, said exhaust pipe having a widened portion of a considerable volume located in front of said body in the direction of flow of the gases, said body being provided with a plurality of flow passages for the exhaust gases extending at least approximately in the longitudinal direction of said gas exhaust pipe, the sum of the smallest cross-sectional areas of said passages being substantially smaller than the cross-sectional area of said gas exhaust pipe, and the length of each passage in the direction of flow of the gases being several times its largest cross-sectional dimension.

EINAR OLOF EUGEN TYDÉN.